(12) United States Patent
Morgan et al.

(10) Patent No.: US 9,202,527 B2
(45) Date of Patent: Dec. 1, 2015

(54) MODULAR INTERFACE COMMUNICATIONS WITH A STORAGE CARTRIDGE

(71) Applicant: SEAGATE TECHNOLOGY LLC, Scotts Valley, CA (US)

(72) Inventors: Michael Gene Morgan, Cupertino, CA (US); Homer Stewart Pitner, Fremont, CA (US)

(73) Assignee: Seagate Technology, LLC, Cupertino, CA (US)

( * ) Notice: Subject to any disclaimer, the term of this patent is extended or adjusted under 35 U.S.C. 154(b) by 96 days.

(21) Appl. No.: 13/908,867

(22) Filed: Jun. 3, 2013

(65) Prior Publication Data

US 2014/0355199 A1 Dec. 4, 2014

Related U.S. Application Data

(60) Provisional application No. 61/347,152, filed on May 21, 2010.

(51) Int. Cl.
*H01R 13/62* (2006.01)
*G11B 33/12* (2006.01)
*G11B 33/02* (2006.01)
*H01R 13/74* (2006.01)

(52) U.S. Cl.
CPC ............ *G11B 33/122* (2013.01); *G11B 33/022* (2013.01); *H01R 13/745* (2013.01)

(58) Field of Classification Search
CPC .................... H01R 9/0735; H01R 13/6272
USPC .................. 439/329, 354, 327, 374, 357, 358
See application file for complete search history.

(56) References Cited

U.S. PATENT DOCUMENTS

| | | | |
|---|---|---|---|
| 3,582,867 A | 6/1971 | Thompson | |
| 4,850,889 A | 7/1989 | LaSota | |
| 5,092,774 A | 3/1992 | Milan | |
| 5,391,091 A | 2/1995 | Nations | |
| 5,647,758 A | 7/1997 | Ichikawa | |
| 6,305,959 B1 | 10/2001 | Baker | |
| 6,776,660 B1 | 8/2004 | Kubota | |
| 6,957,975 B2* | 10/2005 | Kuroda et al. | 439/358 |
| 7,207,825 B2* | 4/2007 | Le Gallic et al. | 439/357 |
| 7,285,004 B1* | 10/2007 | Fukuda et al. | 439/358 |
| 7,429,197 B2 | 9/2008 | Weis | |
| 7,524,198 B2* | 4/2009 | Nguyen et al. | 439/131 |
| 2002/0022395 A1* | 2/2002 | Ichikawa et al. | 439/358 |
| 2010/0268858 A1 | 10/2010 | Lee | |

* cited by examiner

*Primary Examiner* — Phuongchi T Nguyen
(74) *Attorney, Agent, or Firm* — Hall Estill Attorneys at Law

(57) ABSTRACT

An interface connector apparatus and associated method is provided having a reach portion extending from a body portion a first distance, and electrical contacts at an end of the reach portion. An alignment member is connected to the reach portion and extends from the body portion a second distance that is greater than the first distance, the alignment member including a retainer operably imparting a bias that retains the interface connector in another device.

10 Claims, 10 Drawing Sheets

MODULAR INTERFACE COMMUNICATIONS WITH A STORAGE CARTRIDGE

RELATED APPLICATION

This application is a continuation of U.S. patent application Ser. No. 13/033,537.

SUMMARY

In some embodiments an interface connector is provided having a reach portion extending from a body portion a first distance, and electrical contacts at an end of the reach portion. An alignment member is connected to the reach portion and extends from the body portion a second distance that is greater than the first distance, the alignment member including a retainer operably imparting a bias that retains the interface connector in another device.

In some embodiments an interface connector is provided for interfacing with an electronic assembly. The electronic assembly includes an enclosure containing a data storage drive having a self-contained electrical connector that is recessed a distance away from an inner surface of the enclosure. The interface connector has a reach portion extending from a body portion, and electrical contacts at an end of the reach portion. A blind engagement member is connected to the reach portion and sized to operably contact the electronic assembly to align the electrical contacts with the data storage drive's electrical connector In some embodiments a method is provided that includes: obtaining an interface connector for interfacing with an electronic assembly, the electronic assembly including an enclosure containing a data storage drive having a self-contained electrical connector that is recessed a distance away from an inner surface of the enclosure; inserting a reach portion of the interface connector through an opening in the enclosure to contact a blind engagement member of the interface connector against the electronic assembly to align the electrical contacts with the data storage drive's connector; and after contacting the blind engagement member against the electronic assembly, further inserting the reach portion through the opening to contact electrical contacts at an end of the reach portion against the data storage drive's connector.

DETAILED DESCRIPTION

The demand for digital data storage capability now proliferates throughout many and diverse types of consumer electronics devices. Not only does the demand mean more devices have onboard storage capability, and not only is the demand consistently for more storage capacity in smaller packages, but more recently the demand is that the storage capacity itself be modular, meaning it is portable and interconnectable. That is, for example, portable data storage devices are desired to store movies, audio, personal information, still pictures, maps or other navigation information, and the like, on the go. Making good practical use of the stored data requires that it can be employed as a modular component, one that can be easily and reliably exchanged between various types of consumer electronics devices, such as desktop and laptop computers, digital media players, vehicle audio/video systems, distributed storage networks, and the like, employing various different communications protocols.

Data storage devices like solid state drives, disc drives, and the like, advantageously offer high-capacity data storage capability with acceptably fast data transfer rates. Although such drives have successfully been employed as components in portable devices, such as laptop computers and the like, such a drive is not well suited to be used as a portable device in and of itself. However, in accordance with the present embodiments, such a drive can be well suited for such applications if it can be encased within a protective cartridge housing and connected modularly to various different communications protocols.

Figure 1:
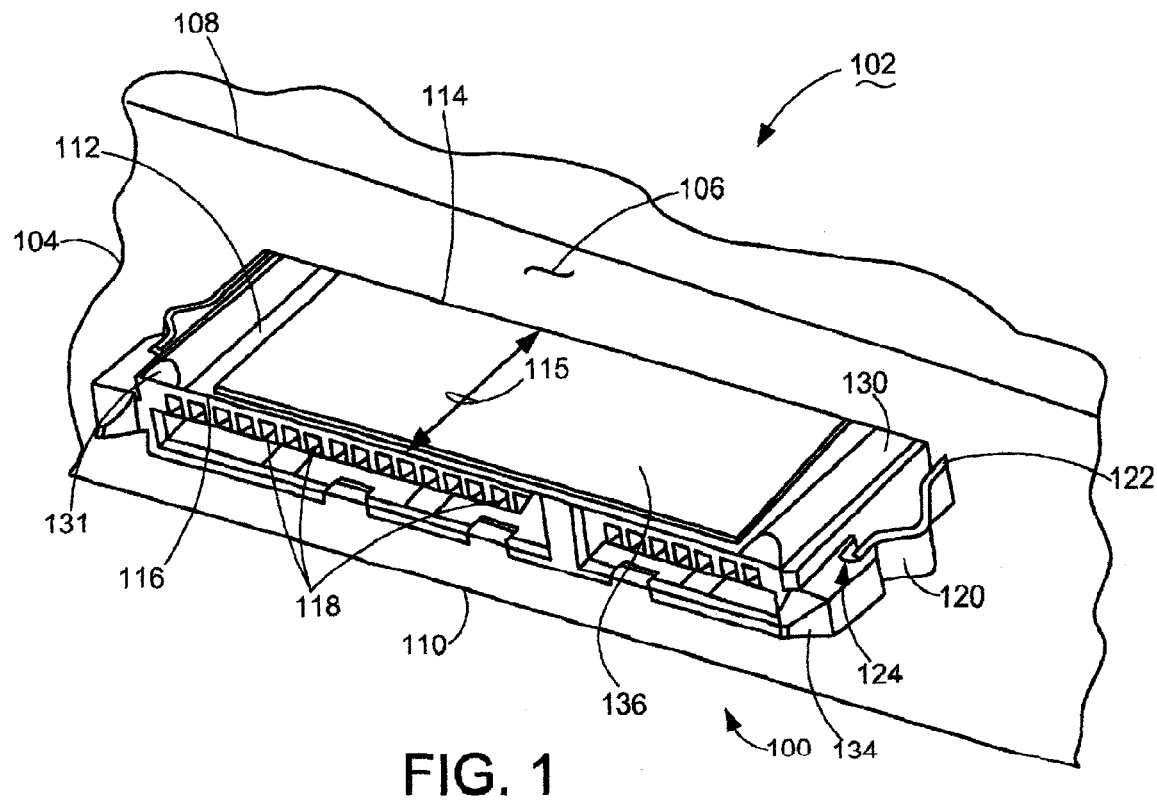
FIG. 1 is a cutaway isometric depiction of a serial interface connector constructed in accordance with embodiments of the present invention.
Figure 3:
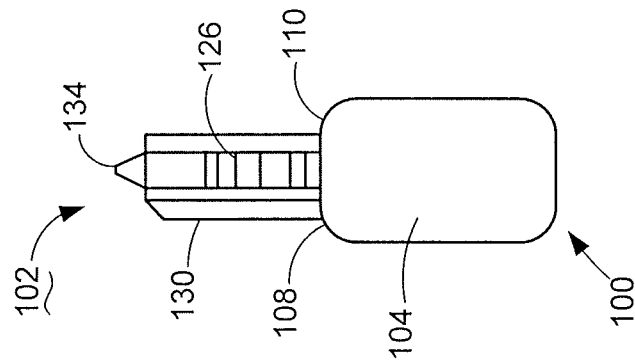
FIG. 3 is a side view of the serial interface connector of FIG. 2.
Figure 2:
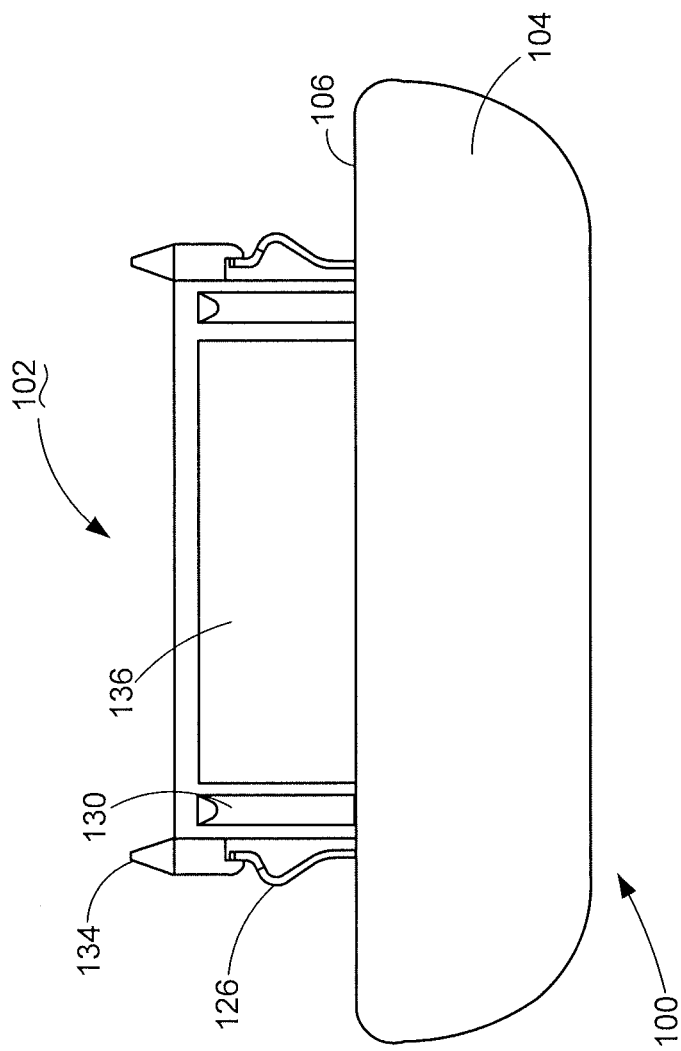
FIG. 2 is a top view of the serial interface connector of FIG. 1.

FIGS. 1-3 are isometric, top, and side depictions, respectively, of a serial interface connector 100 forming a portion of a serial communications interface 102 (FIG. 9) that is constructed in accordance with embodiments of the present invention. The serial interface connector 100 has a body portion 104 (cutaway in FIG. 1) defining a substantially planar surface 106 extending between a top edge 108 and a bottom edge 110. The body portion 104 is sized and structured to facilitate it being grippable, either manually or by an end effector, while operably connecting and disconnecting the serial interface connector 100 to/from a serial communications device. The serial interface connector 100 also has a protuberant reach portion 112 extending at a proximal end 114 thereof substantially orthogonally from the planar surface 106 and terminating at a cantilevered distal end 116. The reach portion 112 supports a plurality of electrical contacts 118 adjacent the distal end 116.

The serial interface connector 100 is sized and configured to electrically connect to a storage cartridge (FIG. 6) that has a housing enclosing a recessed serial communications device. Advantageously, the serial interface connector 100 is configured to electrically connect directly to a data port of the serial communications device itself, eliminating the need and associated cost of providing a flush mount connector for the recessed data port. Importantly, however, making an electrical connection with the recessed data port can be problematic because the user or automated equipment inserting the serial interface connector 100 likely does not have line of sight access to the data port. Such an operation is referred to as a "blind connection," because vision or optics cannot be relied upon to ensure that a robust electrical connection is made.

The serial interface connector 100 is configured with features that ensure that a desired robust connection is made consistently. First, the length of the reach portion 112 defines a reach insertion length 115 between its proximal and distal ends 114, 116 that is adequate for the electrical contacts 118 to reach and connect directly to the serial communication device's data port, with no intervening electrical connector therebetween. Further, the serial interface connector 100 is provided with blind engagement features that align it with and retain it in connection with the serial communication device's data port.

A first blind engagement feature is a retainer member 120. In these illustrative embodiments a pair of retainer members 120 is disposed on opposing edges of the reach portion 112, although the present embodiments are not so limited. The retainer member 120 here is a latch that is constructed of a spring clip affixed at a proximal end 122 to the body 104 and cantilevered therefrom. A distal end of the spring clip is laterally constrained within a channel 124, and the spring clip is biased outwardly against an outer wall of the channel 124. These depicted embodiments are illustrative, not limiting, in that other embodiments contemplate the proximal end constrained in at least one of the body portion and the reach portion.

Figure 4:
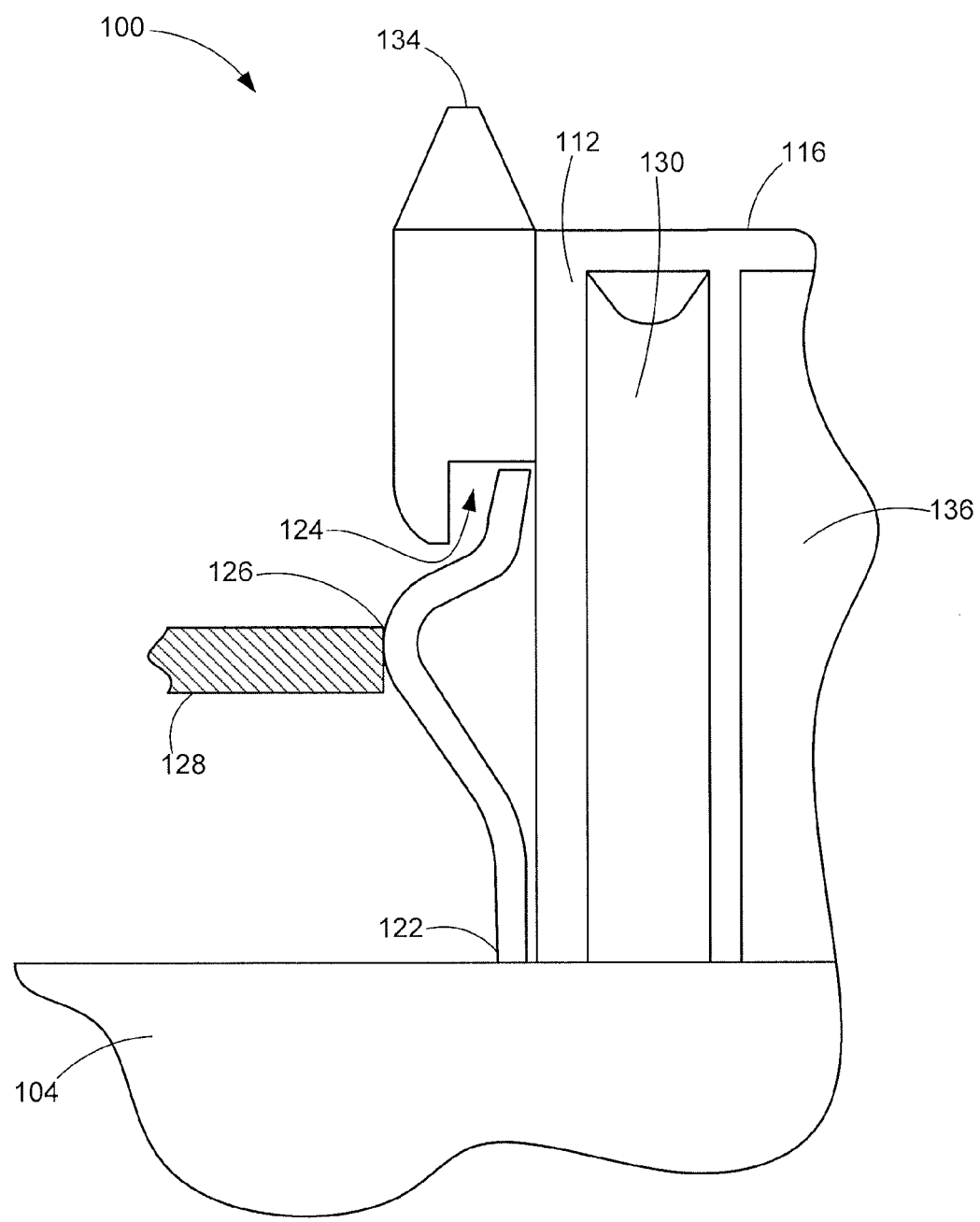
FIG. 4 is an enlarged portion of the serial interface connector of FIG. 2 depicting the protuberant actuator lobe of the retainer feature operably engaging the cartridge.

FIG. 4 depicts how, while inserting the serial interface connector 100, a protuberant actuator lobe 126 of the spring clip contactingly engages a respective deflector, such as a portion of a cartridge 128 into which the serial interface connector 100 is being inserted, to deflect the spring clip inwardly. The deflector can be a portion of the housing, a portion of the serial communications device in the housing, or a portion of some other component in the housing. The protuberant actuator lobe 126 clearingly disengages the deflector when the serial interface connector 100 is fully inserted (FIG. 11), where it becomes seated with the serial communication device's data port. That causes the spring clip bias to return it to the outwardly biased default position (as in FIG. 2). The spring clip's return causes it to contactingly engage the outer wall of the channel 124 with sufficient energy to provide an audible and a tactile indication that the serial interface connector 100 is seated with the serial communication device's data port. Thereafter, the resistance of the protuberant actuator lobe 126 to sliding in the opposite (disconnect) longitudinal direction past the deflector provides a retention force urging the serial interface connector 100 to remain electrically seated with the serial communication device's data port.

Returning to FIG. 1, another blind engagement feature on the reach portion 112 is a longitudinally extending rail-shaped crowder member 130, generally forming a laterally protuberant member effectively increasing the thickness of the reach portion 112. In these illustrative embodiments a pair of parallel crowders 130 is depicted on the same planar side of the reach portion 112. In alternative equivalent embodiments only one crowder 130 can be used, or parallel crowders 130 can be provided with one or more on each of the opposing planar sides of the reach portion 112.

Figure 5:
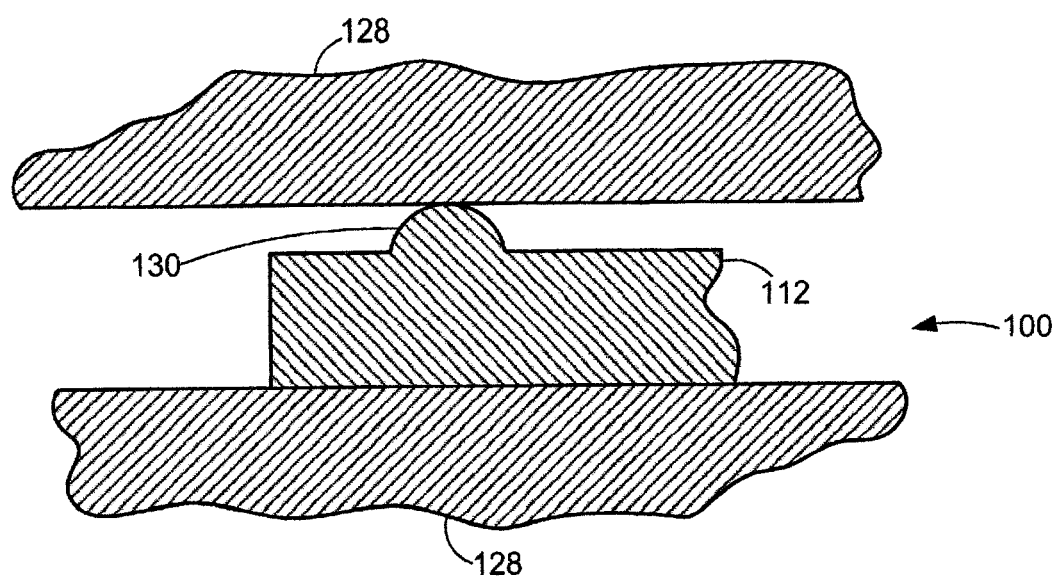
FIG. 5 is a cross sectional view of the serial interface connector of FIG. 2 depicting the crowder member operably engaging the cartridge.

Each crowder 130 is advantageously provided with a tapered leading edge 131 to provide a smooth entry during insertion into the opening 154 (FIG. 6) defined by the cartridge 128. FIG. 5 depicts how each crowder 130 is sized (height in this depiction) to wedgingly provide an interference fit between the reach portion 112 and the cartridge 128 during insertion. The interference mating relationship advantageously removes any slack fit between the inserted reach portion 112 and the cartridge 128, resulting in a robust and positive engagement during insertion as well as an additional retainer force that biases the connector 100 in the seated position.

Returning again to FIG. 1, another blind engagement feature on the reach portion 112 is a longitudinally extending and tapered protuberant member 134 that contactingly engages a corresponding cavity in the cartridge 128 to operably align the reach portion's distal end 116 with the serial communication device's data port. Again, in these illustrative embodiments a pair of opposing protuberant members 134 is depicted although the contemplated embodiments are not so limited. Distal ends of the protuberant members 134 extend longitudinally beyond the reach portion's distal end 116 so that during insertion the reach portion 112 is aligned to the serial communication device's data port before the serial interface connector electrical contacts 118 contactingly engage corresponding electrical contacts in the serial communications device's data port.

The serial interface connector 100 can further be provided with a shield 136 constructed of a layer of electrically conductive material. The electrically conductive shield 136 advantageously provides a terminal to which elongated conductive fingers in the cartridge 128 can contactingly engage as the serial interface connector 100 is inserted. That conductive path allows for a controlled dissipation of any electrostatic charge from the cartridge 128, safeguarding the electrical components in the cartridge 128 and in the serial communications interface 102 (FIG. 9) from electrostatic discharge damage. The shield 136 also protects the electrical components in the cartridge 128 and in the serial communications interface 102 from electromagnetic interference.

Figure 6:
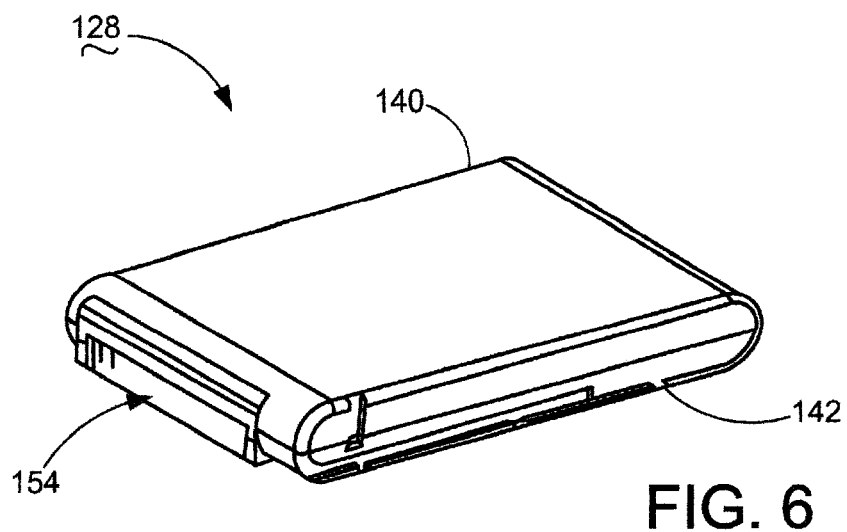
FIG. 6 is an isometric depiction of a storage cartridge that is constructed in accordance with embodiments of the present invention.
Figure 7:
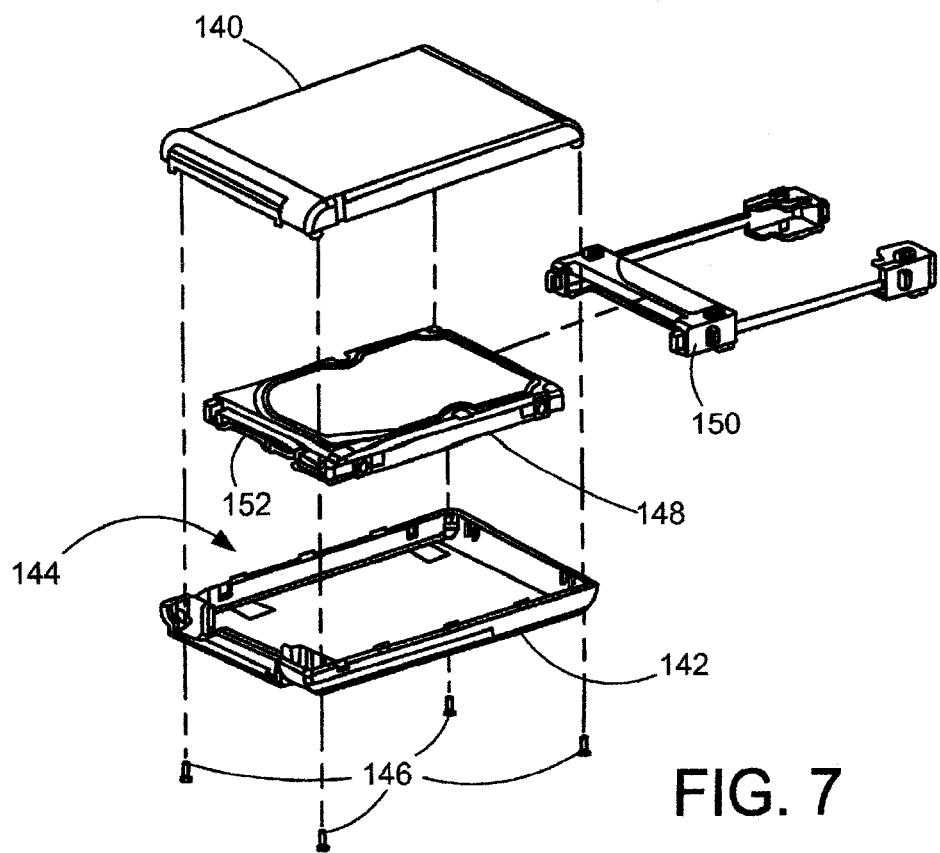
FIG. 7 is an exploded isometric depiction of the storage cartridge of FIG. 6.

FIGS. 6 and 7 depict assembled and exploded views, respectively, of the cartridge 128 in accordance with embodiments of the present invention. The cartridge 128 includes a pair of housing portions 140, 142 that are joined together to define an internal cavity 144. In the illustrative embodiments of FIG. 7 the housing portions 140, 142 are connected together via a plurality of fasteners 146, although in alternative equivalent embodiments (not shown) they can be connected together otherwise such as by interlocking features and/or adhesive and the like.

The cartridge 128 includes a mass data storage drive 148 mounted within the housing 140, 142 in the cavity 144. The drive 148 can be a disc drive or a solid state drive, and the like. An elastomeric shock mount 150 can encompass the drive 148 in the cavity 144 in order to mechanically decouple the housing 140, 142 from the drive 148, thereby damping the environmental effects such as external shocks and vibration. Such drives 148 are typically commercially available in standard form factors, and internal locating features of the housing 140, 142 and/or the shock mount 150 can be provided to selectively mount different form factor drives within the same size cartridge 128.

The drive 148 has a data port 152 configured for establishing external communications with another device for executing access commands transferring data to and from a storage space in the drive 148. In the illustrative embodiments of FIG. 7 the drive 148 has a serial advanced technology attachment (SATA) port, although the claimed embodiments are not so limited.

Figure 8:
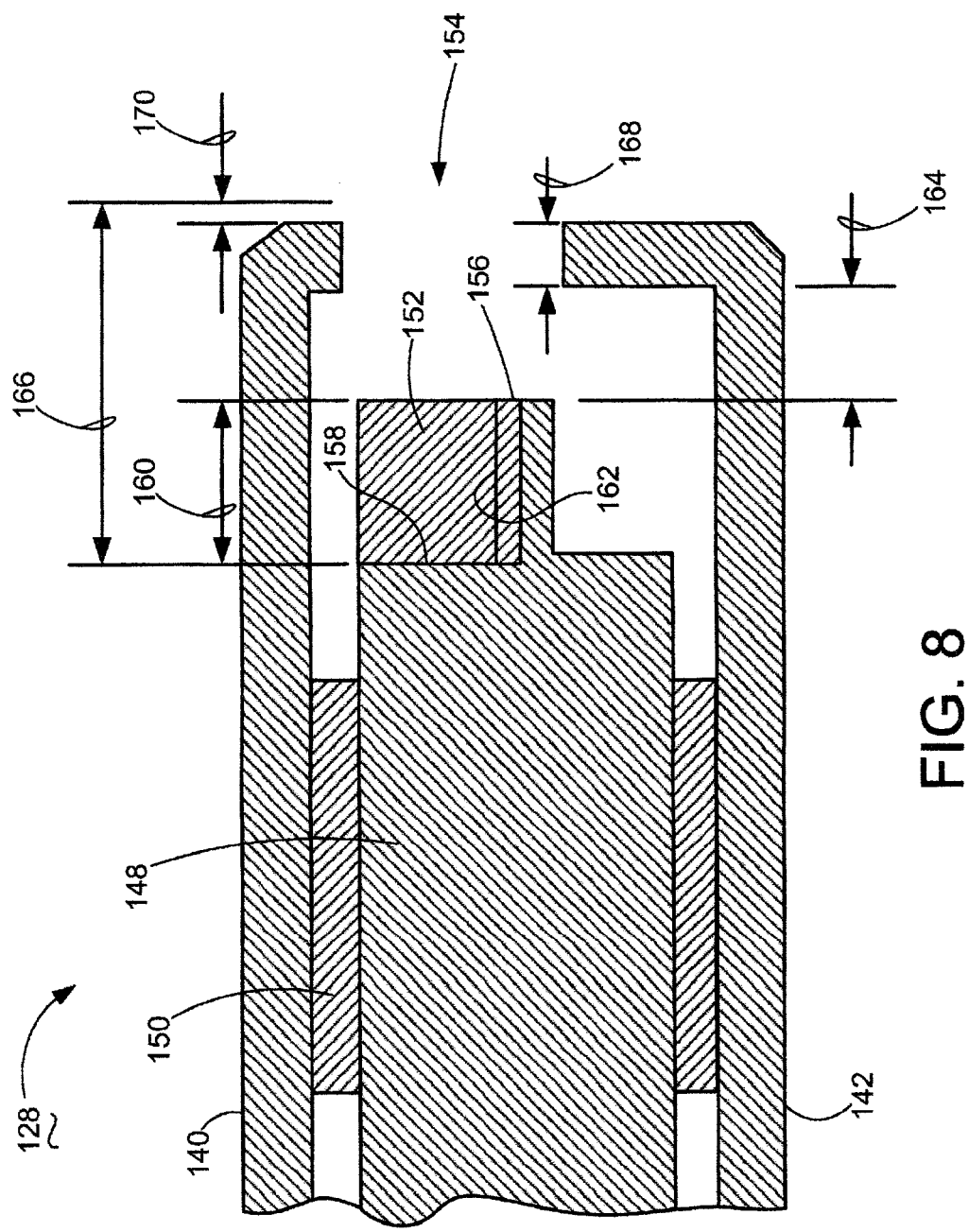
FIG. 8 is a cross sectional depiction of a portion of the storage cartridge of FIG. 6.

The drive 148 is mounted such that the data port 152 is operably recessed within the housing 140, 142, and the data port 152 is there aligned with an opening 154 defined by the housing 140, 142. FIG. 8 diagrammatically depicts the drive 148 and its data port 152 operably mounted in the housing 140, 142. The data port 152 has a leading edge 156 at an initial contacting engagement position of an external connector with the data port 152, and an upright abutment edge 158 providing a positive mating engagement reference surface at a final contacting engagement position where the external connector is seated with the data port 152. The distance between the leading edge 156 and the abutment edge 158 is referred to herein as the longitudinal seating distance 160 of the drive's data port 152. Traversing the data port 152 along the longitudinal seating distance 160 is a plurality of electrical contacts 162 that are exposed for electronically communicating with the external connector.

A longitudinal sway space distance 164 is provided between the leading edge 156 and an inner surface of the housing 140, 142, providing clearance that prevents the drive 148 from contacting the housing 140, 142 during normal operation. A longitudinal reach distance 166 for the external connector to seat with the drive's data port 152 is at least the sum of the longitudinal insertion distance 160, the longitudinal sway space distance 164, the thickness 168 of the housing 140, 142, and a desired longitudinal clearance distance 170 from the outer surface of the housing 140, 142 when the external connector is seated.

The reach portion 112 (FIG. 1) is cross sectionally sized to pass through the opening 154 (FIG. 1) in the housing 140, 142, making the serial interface connector 100 removably insertable into the cartridge 128. Importantly, the reach insertion length 115 (FIG. 1) extends longitudinally from the body portion 104 a distance that is at least the reach distance 166, operably spanning the predefined sway space longitudinal distance 164 when initially inserted so that the reach portion's distal end 116 contactingly engages the drive's data port 152 in the cartridge 128. From reduction to practice it has been determined that the reach insertion length 115 in preferred embodiments is at least nine millimeters long, or longer.

Figure 9:
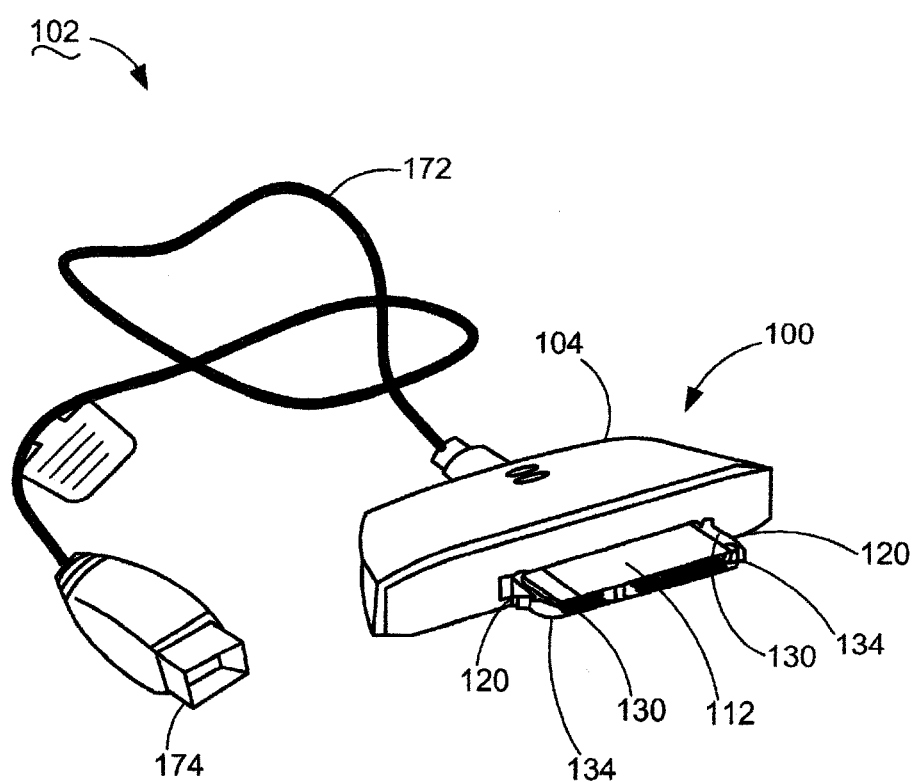
FIG. 9 is an isometric depiction of a communications interface that is constructed in accordance with embodiments of the present invention.

FIG. 9 is an isometric depiction of a serial communications interface 102 that is constructed in accordance with embodiments of the present invention. The serial communications interface 102 includes a communications cable 172 configured to join a remote device (not shown) outside the housing 140, 142 to the serial interface connector 100. In these illustrative embodiments the serial communications interface 102 has another interface connector 174 that is removably connectable, such as being slidably connectable, to the remote device (not shown).

Figure 10:
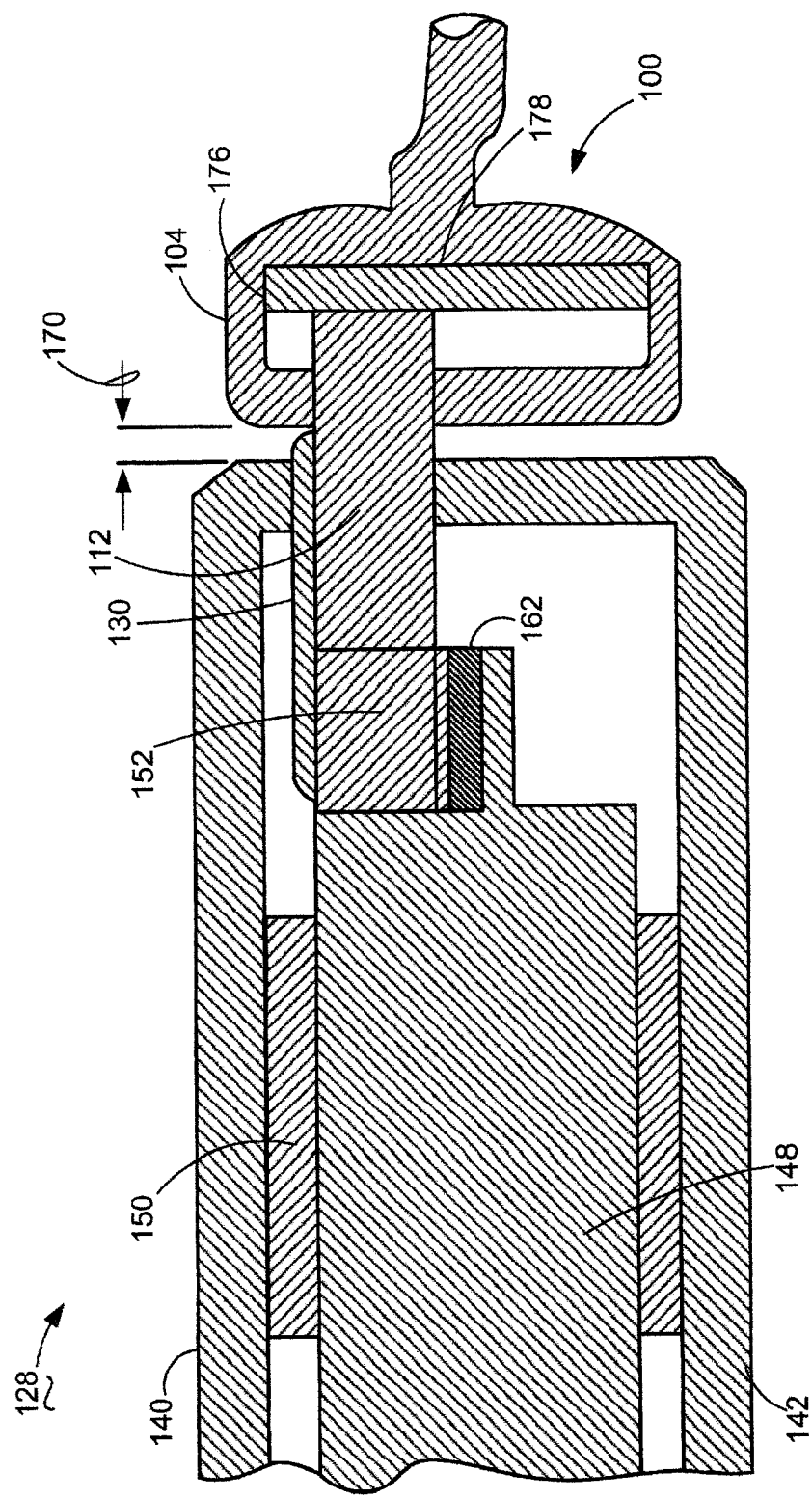
FIG. 10 is a view similar to FIG. 8 but with the interface connector seated with the drive's data port.

FIG. 10 diagrammatically depicts the serial interface connector 100 seated with the data port 152 of the cartridge 128 for operational communications with the drive 148. The body portion 104 is flush-mounted to the housing 140, 142, meaning that when seated the body 104 remains entirely outside the housing 140, 142 and in close proximity thereto separated only by the desired clearance 170. The reach portion 112, contrarily, is sub-flush-mounted to the housing 140, 142, meaning that when seated it passes through the opening 154 (FIG. 8) and extends into the cavity 144 (FIG. 7). Importantly, the sub-flush-mounted reach portion 112 defines a reach insertion length 115 that is sufficient to directly connect to the data port 152 (FIG. 7) without any other intervening electrical connector therebetween. Upon making the initial contacting engagement, the electrical contacts 118 at the reach portion's distal end 116 slidingly engage the contacts 162 in the drive's data port 152. The electrical contacts 118 in some interfaces are electrically connected to a printed circuit board (PCB) 176 contained within the body portion 104 of the interface connector 100. Communications bridge circuitry 178 can reside on the PCB 176, translating access commands for use in the interface communications protocols of the drive 148 and of the remote device. For example, in the illustrative embodiments the serial communications interface 102 can include a communications bridge circuitry 178 bridging the SATA communications protocol of the drive 148 to the communications protocol of the remote device (not shown).

Figure 11:
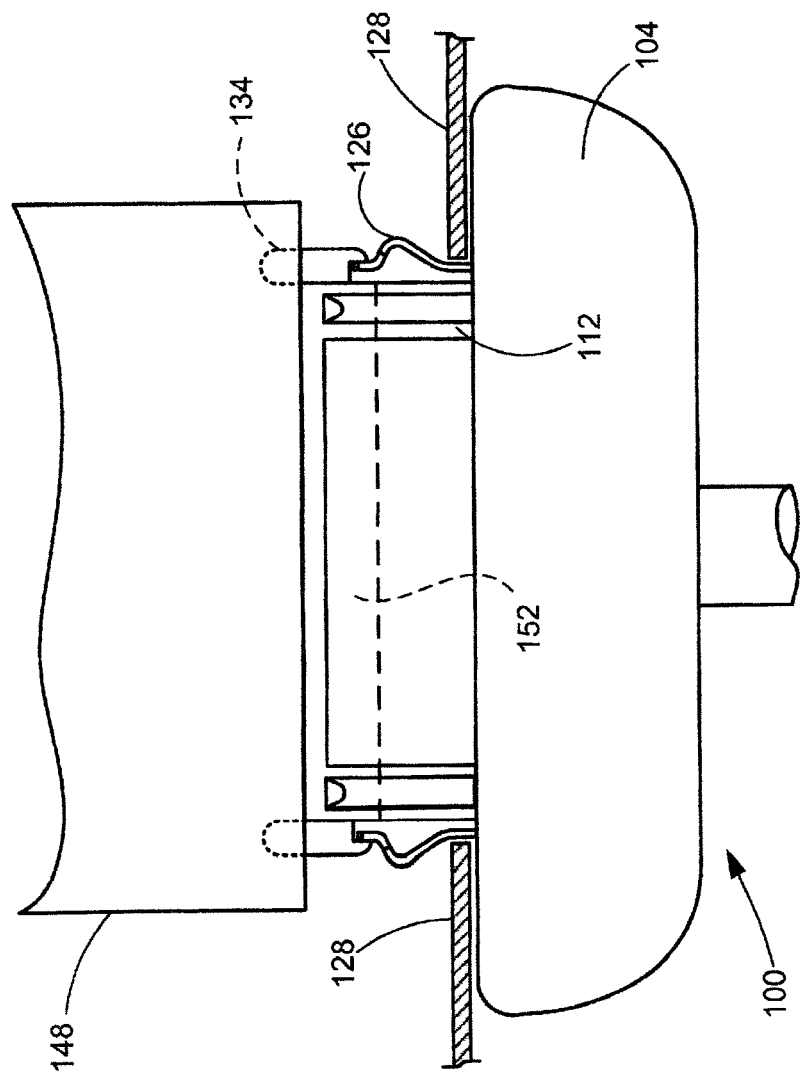
FIG. 11 is a top view similar to FIG. 2 but depicting the interface connector seated with the drive's data port.

FIG. 11 depicts a top view of the serial interface connector 100 seated with the data port 152 as previously discussed in relation to FIG. 10. This view best depicts how the tapered protuberant members 134 first insertingly engage the cartridge 128 (in this case the drive 148) to align the connector 100 with the data port 152. Note that in this seated insertion position, the protuberant actuator lobes 126 have clearingly disengaged the cartridge 128 (such as housing 140, 142) and are thereby free to spring outwardly to impart a retainer bias urging the interface connector 100 and the data port 152 together.

Figure 12:
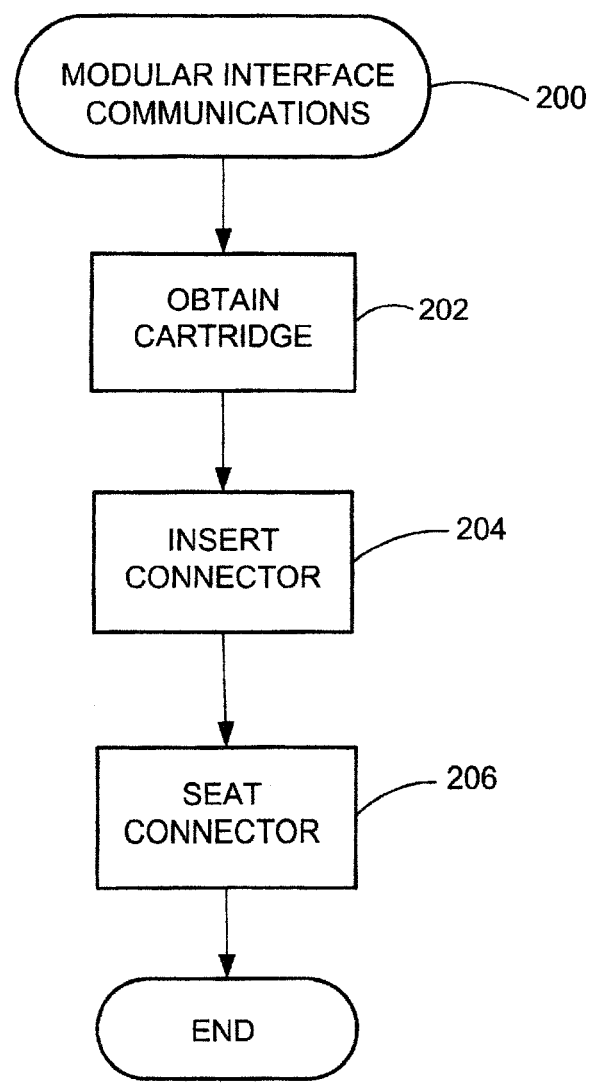
FIG. 12 is a flowchart depicting steps in a method for MODULAR INTERFACE COMMUNICATIONS in accordance with embodiments of the present invention.

The present embodiments contemplate a method corresponding to the aforedescribed apparatus. FIG. 12 is a flowchart depicting steps in a method 200 for MODULAR INTERFACE COMMUNICATIONS in accordance with embodiments of the present invention. The method 200 begins in block 202 with obtaining a cartridge having a mass data storage device with a data port that is recessed by a predetermined sway space distance within a protective housing. In block 204 the connector is inserted into the cartridge a distance at least more than the sway space distance to contactingly engage a distal end of the interface connector directly to the data port. After that initial contact, in block 206 the connector is inserted further to electrically seat the interface connector with the data port and to simultaneously engage the retainer member portion of the interface connector with the cartridge to bias the seated interface connector and the data port together.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed:

1. An interface connector comprising:
   a reach portion extending from a body portion to a distal end;
   electrical contacts at the distal end of the reach portion;
   a blind alignment member defining nonparallel opposing tapered sides extending continuously from a distal end of the blind alignment member to a distal end of the reach portion; and
   a retainer operably imparting a bias that retains the interface connector in a data storage device that is recessed within an enclosure, the body portion being operably flush mounted to the enclosure, the retainer having a spring clip with a free end laterally constrained within a channel defined by the blind alignment member restricting movement of the free end between moving toward an outer wall of the channel at an outwardly biased position and moving toward the reach portion at an inwardly biased position, the spring clip having a lobe contactingly engaging a deflector such as the enclosure or the data storage device, the lobe contactingly engaging the deflector during insertion of the serial connector to move the free end to the inwardly biased position and the lobe clearingly disengaging the deflector when the serial connector is fully inserted moving the spring clip to the outwardly biased position.

2. The interface connector of claim 1 comprising an electrically conductive shield.

3. The interface connector of claim 1 wherein the retainer comprises a spring clip.

4. The interface connector of claim 1 wherein a leading edge of the blind alignment member is angled.

5. The interface connector of claim 1 wherein the blind alignment member operably contacts the data storage device for alignment of the electrical contacts with the data storage device's connector.

6. The interface connector of claim 5 wherein the blind alignment member operably contacts the data storage device's connector.

7. The interface connector of claim 1 comprising a crowder member.

8. The interface connector of claim 7 wherein the crowder member extends longitudinally in substantially the same direction that the reach portion extends from the body portion.

9. The interface connector of claim 8 wherein a leading edge of the crowder member is angled.

10. A method comprising:
  obtaining an interface connector for interfacing with an electronic assembly, the electrical connector having a blind alignment member, and the electronic assembly including an enclosure containing a data storage drive having a self-contained electrical connector that is recessed a distance away from an inner surface of the enclosure, and the interface connector having a retainer operably imparting a bias that retains the interface connector in the data storage drive, the retainer having a spring clip with a free end laterally constrained within a channel defined by the blind alignment member restricting movement of the free end between moving toward an outer wall of the channel at an outwardly biased position and moving toward the reach portion at an inwardly biased position, the spring clip having a lobe contactingly engaging a deflector such as the enclosure or the electronic assembly;
  inserting a reach portion of the interface connector through an opening in the enclosure to contact the blind alignment member of the interface connector against the electronic assembly to align the electrical contacts with the data storage drive's connector, the lobe contactingly engaging the deflector during the inserting to move the free end to the inwardly biased position; and
  after contacting the blind alignment member against the electronic assembly, further inserting the reach portion through the opening to contact electrical contacts at an end of the reach portion against the data storage drive's connector, the lobe clearingly disengaging the deflector when the interface connector is fully inserted moving the spring clip to the outwardly biased position.

* * * * *